(12) United States Patent
Wu et al.

(10) Patent No.: US 9,708,224 B2
(45) Date of Patent: Jul. 18, 2017

(54) METHOD OF MAKING TEXTURED CERAMICS

(71) Applicants: Dongguan South China Design and Innovation Institute, Dongguan, Guangdong (CN); Guangdong University of Technology, Guangdong (CN)

(72) Inventors: Shanghua Wu, Dongguan (CN); Qiangguo Jiang, Dongguan (CN); Weiming Guo, Dongguan (CN); Shangxian Gu, Dongguan (CN); Maopeng Zhou, Dongguan (CN); Wei Liu, Dongguan (CN); Lixia Cheng, Guangdong (CN); Bo Wang, Guangdong (CN); Chengyong Wang, Guangdong (CN); Qimin Wang, Guangdong (CN)

(73) Assignees: DONGGUAN SOUTH CHINA DESIGN AND INNOVATION INST., Dongguan (CN); GUANGDONG UNIVERSITY OF TECHNOLOGY, Guangzhou (CN)

( * ) Notice: Subject to any disclaimer, the term of this patent is extended or adjusted under 35 U.S.C. 154(b) by 28 days.

(21) Appl. No.: 14/821,817

(22) Filed: Aug. 10, 2015

(65) Prior Publication Data

US 2017/0015593 A1 Jan. 19, 2017

(30) Foreign Application Priority Data

Jul. 15, 2015 (CN) .......................... 2015 1 0414902

(51) Int. Cl.
*C04B 35/593* (2006.01)

(52) U.S. Cl.
CPC .................................. *C04B 35/593* (2013.01)

(58) Field of Classification Search
CPC ... C04B 14/328; C04B 35/584; C04B 35/593; C04B 2235/3878; C04B 2237/368
(Continued)

(56) References Cited

U.S. PATENT DOCUMENTS 4,326,039 A * 4/1982 Kriegesmann ........ C04B 35/575
501/88
4,622,186 A * 11/1986 Mizutani ............... C04B 35/593
264/570

(Continued)

*Primary Examiner* — Nahida Sultana
(74) *Attorney, Agent, or Firm* — Hemisphere Law, PLLC

(57) ABSTRACT

The invention proposed a novel hot pressing flowing sintering method to fabricate textured ceramics. The perfectly 2-dimensional textured Si3N4 ceramics (Lotgering orientation factor fL 0.9975) were fabricated by this method. During the initial sintering stage, the specimen flowed along the plane which is perpendicular to the hot pressing direction under pressure, through the controlling of the graphite die movement. The rod-like β-Si3N4 nuclei was easily to texture during the flowing process, due to the small size of the β-Si3N4 nuclei and the high porosity of the flowing specimen. After aligned, the β-Si3N4 grains grew along the materials flowing direction with little constraint. textured Si3N4 ceramics fabricated by this invention also showed high aspect ratio. Compared to the conventional hot-forging technique which contained the sintering and forging processes, hot pressing flowing sintering proposed is simpler and lower cost to fabricate textured Si3N4.

4 Claims, 4 Drawing Sheets

(58) Field of Classification Search
USPC .................................................. 264/667, 668
See application file for complete search history.

(56) References Cited

U.S. PATENT DOCUMENTS

| | | | | |
|---|---|---|---|---|
| 4,643,858 | A * | 2/1987 | Mizutani | C04B 35/6455 264/570 |
| 4,904,624 | A * | 2/1990 | Yeckley | C04B 35/593 264/604 |
| 4,917,843 | A * | 4/1990 | Gyarmati | C04B 35/645 156/151 |
| 4,960,734 | A * | 10/1990 | Kanai | C04B 35/583 264/122 |
| 5,234,642 | A * | 8/1993 | Nishioka | C04B 35/597 264/626 |
| 5,234,643 | A * | 8/1993 | Matsumoto | C04B 35/593 264/101 |
| 5,294,575 | A * | 3/1994 | Matsumoto | C04B 35/593 501/96.3 |
| 5,346,869 | A * | 9/1994 | Nishioka | C04B 35/584 501/118 |
| 5,378,417 | A * | 1/1995 | Yasutomi | B32B 18/00 264/620 |
| 5,674,793 | A * | 10/1997 | Hirao | C04B 35/5935 117/7 |
| 5,736,092 | A * | 4/1998 | Apte | C04B 35/117 264/432 |
| 7,964,296 | B2 * | 6/2011 | Mikijelj | C04B 35/591 428/446 |
| 2010/0273639 | A1 * | 10/2010 | Tuecks | C04B 35/597 501/152 |
| 2013/0105386 | A1 * | 5/2013 | Deville | B01J 21/066 210/510.1 |
| 2014/0147673 | A1 * | 5/2014 | Kunieda | B01J 29/85 428/402 |
| 2015/0121827 | A1 * | 5/2015 | Cai | C04B 38/0012 55/523 |
| 2015/0290834 | A1 * | 10/2015 | Klotz | B28B 1/007 210/510.1 |
| 2016/0129504 | A1 * | 5/2016 | Middlemiss | B23B 27/148 264/40.6 |
| 2016/0198576 | A1 * | 7/2016 | Lewis | H01L 23/49822 361/761 |

* cited by examiner

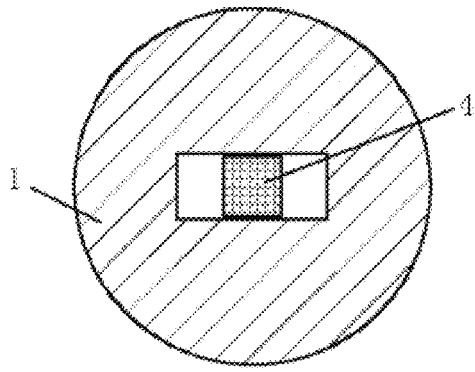 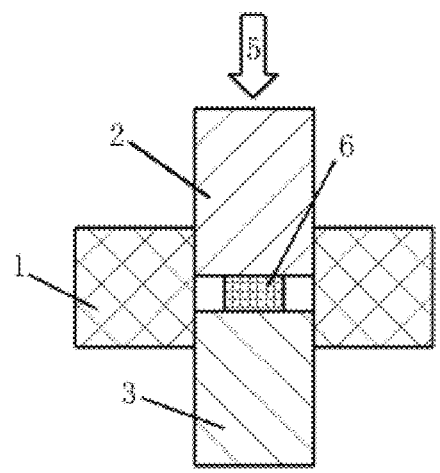
Fig. 4A                    Fig. 4B

METHOD OF MAKING TEXTURED CERAMICS

BACKGROUND OF THE INVENTION

1. Technical Field

The invention relates to ceramics technology, especially to a method of making textured ceramics.

2. Description of Related Art

Silicon nitride ($Si_3N_4$) ceramics is one of the most promising materials for high-temperature applications. $Si_3N_4$ has tough interlocking microstructures consisting of elongated grains. Generally, the elongated grains randomly distribute in $Si_3N_4$ ceramics, which result in an isotropic microstructure. However, the rod-like grains in anisotropic $Si_3N_4$ are oriented one- or two-dimensionally are expected to show higher flexure strength and fracture toughness in specific directions than those of conventional isotropic $Si_3N_4$.

There are three main method to fabricate textured $Si_3N_4$. (1) Tap-Casting. $Si_3N_4$ with a preferred orientation of large elongated grains was obtained by tape casting of starting powder slurry seeded with rod-like $Si_3N_4$.1-4 (2) Hot-forging. The conventional $Si_3N_4$ consisting of elongated grains yield a highly anisotropic microstructure by superplastic plane-strain compressive deformation, and the rod-like grains tend to be aligned in the extruding direction.5-6 The sintering-forging was improvement of the hot-forging.7 The texturing mechanism were same to decrease the grain size by reducing the sintering time and temperature, the texturing degree was increased by sintering-forging. (3) Magnetic field alignment. The nonmagnetic ceramic particles are oriented during slurry consolidation under a strong magnetic field (typically ≥10 T), thereby resulting the information of textured ceramics during sintering.8-10

In the three methods mentioned above, the hot-forging is a common method for texturing. As shown in FIG. 1 (a), the hot-forging method were consisted of two steps: sintering and forging.11 First, the $\beta$-$Si_3N_4$ with high density and isotropic rod-like grains was obtained in high temperature sintering process. Second, the forging was conducted at high temperature with high pressure, the alignment of the elongated grains was obtained due to its high temperature superplastic deformation. This process would cost much more time and energy. The texturing degree of the hot-forging was limited by amount of the superplastic deformation which depends on the grain size of the sintered sample, liquid phase, forging temperature, and pressure. In this report, the fabrication of highly 2-dimensional textured (a,b-axis aligned) $Si_3N_4$ was attempted to obtain by one step, named it hot pressing flowing sintering (HPFS).

BRIEF SUMMARY OF THE INVENTION

We proposed a method named hot pressing flowing sintering for texturing ceramics. The perfectly 2-dimensional textured $Si_3N_4$ ceramics were fabricated by hot pressing flowing sintering. The Lotgering orientation factor fL for $Si_3N_4$ texture was 0.9975. During the initial sintering stage, the transition of equiaxed $\alpha$-$Si_3N_4$ particles into the rod-like $\beta$-$Si_3N_4$ nuclei was carried out. Then, the specimen with rod-like $\beta$-$Si_3N_4$ nuclei flowed along the plane which perpendicular to the hot pressing direction under pressure through the controlling of the graphite die movement. The rod-like $\beta$-$Si_3N_4$ nuclei was easily to texture under the flowing process, due to the small size of the $\beta$-$Si_3N_4$ nuclei and the high porosity of the flowing specimen. After aligned, the $\beta$-$Si_3N_4$ grains grew along the materials flowing direction with little constraint, which accelerated significantly the grains growth. So all grains showed higher aspect ratio than hot pressed specimen. The present study have indicated the hot pressing flowing sintering would be a simpler and low cost method to fabricate the textured $Si_3N_4$ ceramics, compared to conventional hot-forging.

A method of making textured ceramics, comprising the steps of: a, composition: mixing and drying of ingredients containing silicon nitride powder and sintering aids; b, forming a green part; the powder (after drying step) is dry-pressed through steel die and then cold isostatic pressing to obtain a shaped body; c, textured ceramic making: using flowing hot pressing sintering method to make the green part obtained in above step b to flows in a one-dimensional or two-dimensional direction in order to achieve high-performance ceramics with preferred grain arrangement and anisotropy growth; wherein the hot press applied pressure is 10-50 MPa, and temperature in the range of 1000-2000° C.

Wherein the sintering aid is any one or more alkali metal oxides or rare earth metal oxides.

Wherein the processing steps include mixing the ingredients and drying the slurry: mixing: the ceramic powders and the sintering aids are added to the solvent to form a slurry, and then adding the silicon nitride grinding balls, the weight ratio of silicon nitride grinding balls versus the ceramic powders is (1-5): 1, and followed by ultrasonic dispersion; wherein weight ratio of the sintering aid versus the $\alpha$-phase silicon nitride powder is (0.5-35): 100.

Wherein the solvent is any one of water, ethanol, acetone, propanol, or more, the volume ratio of the mixed powders versus the solvent is 1: (1 -3).

The mixed slurry is poured into a rotary evaporator for drying, the drying temperature is 40-60° C.; after drying, the powder is sieved.

Wherein the dried powder is sieved through 30-200 mesh.

In step b to form a green part, comprises two steps: first step where the green part is dry-formed in the steel die, and then next step: the green part is cold isostatic pressed for increased green density.

Wherein the cold isostatic pressure is in the range of 50-300 MPa.

Wherein the texturing process is performed in a graphite mold, using flowing inert gas atmosphere for protection.

A ceramic made by a texturing method can be used for the manufacture of metal cutting tools, heat dissipation board, ball bearings, cast aluminum crucible, ceramic engine turbine and other structural parts.

BRIEF DESCRIPTION OF THE DRAWINGS

FIGS. 4A and 4B are schematic illustrations of texturing mechanisms of $\beta$-$Si_3N_4$ ceramics by HPFS;

Figure 1:
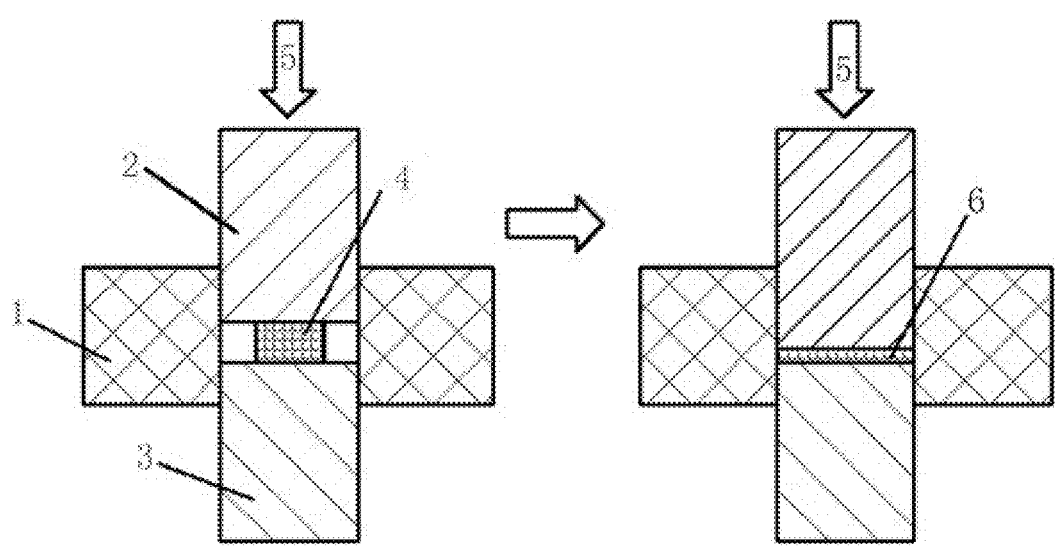
FIG. 1 is a schematic illustration of temperature-time-pressure process for: (a) Hot-forging, (b) HPFS, (c) HP.

As shown in the Drawings: 1, a graphite mold; 2, the top punch; 3, lower punch; 4, ceramic blank; 5, the applied pressure; 6, the textured ceramics.

DETAILED DESCRIPTION OF THE INVENTION

The raw materials used in this study were 90wt % $\alpha$-$Si_3N_4$ powder (Ube Industries Ltd., Tokyo, Japan), 4 wt % La2O3, 4 wt % Yb2O3 (Beijing Fandecheng Corp., Beijing, China), and 2 wt % MgO (Hangzhou Wanjing Corp., Hangzhou, China). The powder mixtures were ball milled for 24 h in ethanol using Si3N4 balls. After drying, the powder was gently grounded and sieved 100 mesh. The powder mixtures were placed into a graphite die with specific tolerance between graphite punch and die (Shenyang Weitai Corp., Shenyang, China). The Si3N4 was fabricated by a new method (HPFS). Schematic illustration of temperature-time-pressure process for HPFS is shown in FIG. 1 (b). A low pressure of 5 MPa was applied ( ) on the sample before the start of sintering. The frictional force between the sample and graphite die was enough to keep the graphite die from falling down. When the sintering temperature reached 1500° C., the loading pressure was released and the graphite die would fall down. Then the pressure was increased to 30 MPa gradually before 1700° C. Finally, the sample was sintered at 1800° C. for 1 h under a pressure of 30 MPa in N2 atmosphere. In comparison with the HPFS, the mixed powder was also hot pressed (HP) at 1800° C. for 1 h under a pressure of 30 MPa in N2 atmosphere. Schematic illustration of temperature-time-pressure process for HP is shown in FIG. 1 (c), and the graphite die was stationary.

The crystallographic orientation (Lotgering orientation factor) in the sintered bodies was evaluated by X-ray diffraction (Bruker D8, Germany) on the surfaces parallel and perpendicular to the hot pressing direction, respectively. The polished surface of the sintered ceramics were plasma etched by CF4 containing 10% O2 (Structure Probe Corp, Pennsylvania, America). The textured microstructure of the etched surfaces were characterized by a scanning electron microscope (SEM, FEI Corp., Eindhoven, Dutch).

Figure 2:
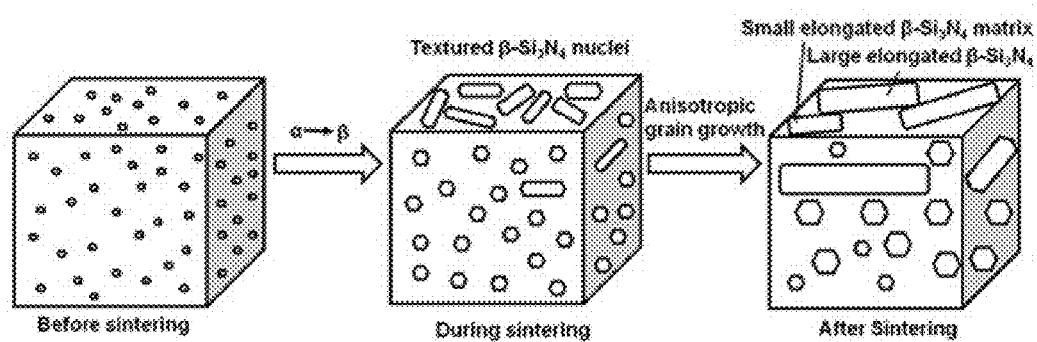
FIG. 2 is a XRD patterns of sintered samples by HPSF ((a) plane normal to the hot pressing direction, (b) plane parallel to the hot pressing direction) and HP (c)

FIG. 2 shows the XRD patterns of sintered Si3N4 by HPFS and HP. Obviously, the diffraction peaks are different on the different planes of sintered samples by HPFS. On the planes perpendicular to the hot pressing direction, the diffraction peaks of the (hk0) planes were substantially stronger, especially the (200) and (210) planes, while the (101) and (002) planes disappeared, as shown in FIG. 2 (a). On the plane parallel to the hot pressing direction, the diffraction peaks of the (hk0) planes become relatively weak, whereas the diffraction peaks of the (101) plane appears with high intensity, and the (002) plane is the strongest, as shown in FIG. 2 (b). XRD pattern of the sample prepared by HP is shown in FIG. 2 (c). All the (hk1) peaks could be found, and the (101) plane is the strongest. According to the relative peak intensity of the two samples, it could be concluded that the Si3N4 prepared by HPFS was textured. The degree of orientation plane of textured Si3N4 can be intuitively evaluated from the relative peak intensity of the (101) plane in the XRD pattern of the top plane (perpendicular to the hot pressing direction).11 For the XRD pattern of samples prepared by HPFS, the disappearance of the (101) plane (perpendicular to the hot pressing direction) indicates the formation of a perfect 2-dimension texture.

The Lotgering orientation factor was used to evaluate the degree of texture in ceramics prepared by HPFS. The Lotgering orientation factor fL, according to the Lotgering reported, 12 can be expressed as, $$f_L = \frac{P - P_0}{1 - P_0}, P \text{ and } P_0 = \frac{\Sigma I_{(hk0)}}{\Sigma I_{(hkl)}}$$

where $\Sigma(hk0)$ are the sums of peak intensities of the (hk0) planes perpendicular to the hot pressing direction, and $\Sigma(hkl)$ are the sums of peak intensities of all the (hkl) planes perpendicular to the hot pressing direction. The value of P was obtained from the sintered ceramic, and the value of P0 was obtained from the standard PDF card (No. 33-1160) of β-Si3N4. As a result, the value of fL is 0.9975, which further confirmed that Si3N4 by HPFS had the perfect 2-dimensional texture.

Table I shows the textured Si3N4 by different texturing techniques. The texturing degree was evaluated by the following methods, such as fL, pole figure and I(101)/I(210). However, these methods have no comparability. It was well known that high texturing microstructure could be obtained in the strong magnetic field. In this work, the fL by HPFS was higher than that by strong magnetic field, which indicated that higher texturing degree can be obtained using HPFS method. Due to the appearance of the (101) peak on the XRD pattern,17 lower texturing degree was observed during the sintering-forging process compared to HPFS.

Figure 3A:
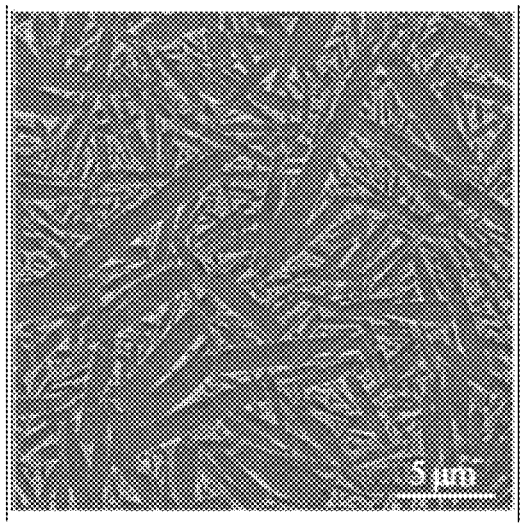
FIGS. 3A and 3B are microstructures of specimens by HPSF ((a) plane normal to the hot pressing direction, (b) plane parallel to the hot pressing direction) and HP (c)
Figure 3B:
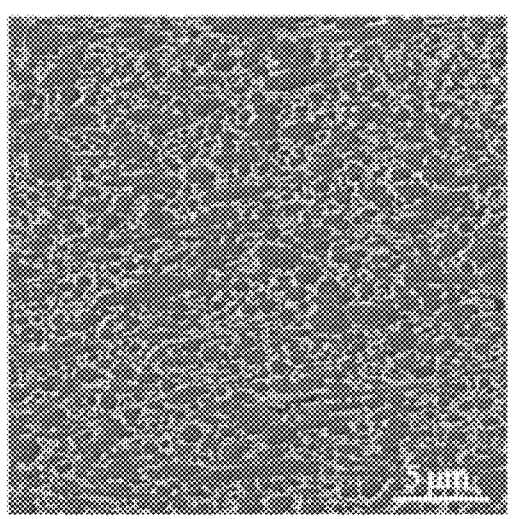

The top plane (plane normal to the hot pressing direction) and side plane (plane parallel to the hot pressing direction) microstructures of Si3N4 sintered by HPFS are shown in FIG. 3 (a) and (b), respectively. The elongated grains have planar orientation, but randomly distribute along the top plane. Thus, the microstructure is anisotropic with two-dimensional alignment, which is identified by XRD. FIG. 3 (c) shows the top plane (plane normal to the hot pressing direction) microstructure of the HP specimen. Obviously, all the grains were random and without texturing. In addition, HPFS specimen have higher aspect ratio than HP specimen.

The schematic illustration of texturing mechanisms of Si3N4 ceramics by HPFS is shown in FIG. 4. During the initial sintering stage, the equiaxed α-Si3N4 particles changed into the rod-like β-Si3N4 nuclei. After the graphite die falling down, the specimen flowed along the plane perpendicular to the hot pressing direction under pressure. The β-Si3N4 nuclei was easily to texture under pressure, due to the small size nuclei and high porosity of the flowing specimen. After aligned, the β-Si3N4 grains grew along the materials flowing direction with little constraint, which called dynamic grain growth. In the HP specimen, with the restriction of the graphite die, the β-Si3N4 grains grew with high steric hindrance, due to grains impingement and coalesce into each other, which called static grain growth. Wu and Chen reported the dynamic grain growth was faster than static growth, 18 which may be the reason for the higher aspect ratio. Therefore, the HPFS not only can lead to texture of β-Si3N4 ceramics, but also increase the aspect ratio of the elongated grains.

The texturing mechanism was different between HPFS and hot-forging. The sintering and texturing were finished by one step in HPFS. The texturing process was based on the flowing of the green compact, not superplasticity of Si3N4. With the wetting by the liquid phase, the green compact was flowing under the pressure. The phase transformation and texturing were happened almost in the same process. Due to the low steric hindrance in the initial sintering stage, it was easily to obtain high texturing degree. However, the hot-forging was based on the superplastic deformation of the Si3N4. It was hard to get the high texturing, due to the high steric hindrance after sintering. The HPFS was a more efficiency and easier method to fabricate high texturing Si3N4 than hot-forging.

TABLE I

Examples of texturing techniques of $Si_3N_4$

| Orientation method | Texture type | Degree of texture |
|---|---|---|
| HPFS | a,b-axis aligned | $f_L = 0.9975$ $f_L = 0.3$* |
| Hot pressing[13] | a,b-axis aligned | |
| Tape casting[14] | c-axis aligned | Pole figure: Max mrd = 15 |
| Strong magnetic field[15] | c-axis aligned | $f_L = 0.97$ |
| Hot-forging[16] | a,b-axis aligned | Pole figure: Max mrd = 4.3 |
| Sintering-forging[17] | a,b-axis aligned | I(101)/I(210) = 0.05 |

*Calculation based on the XRD results.

What is claimed is:

1. A method of making textured ceramics, comprising:
 step a, preparing a powder, wherein the step a comprises milling mixed powders containing a $Si_3N_4$ powder and sintering aids as a slurry in a ball mill using the $Si_3N_4$ powder and drying the slurry to obtain the prepared powder with $\alpha$-$Si_3N_4$ particles;
 step b, forming a green part, wherein the step b comprises dry pressing the prepared powder through a steel die and then performing a cold isostatic pressing on the dry pressed powder to obtain the green part with a shaped body;
 step c, performing a texturing process by a hot pressing flowing sintering, wherein the step c comprises loading the green part in a graphite die, and then gradually increasing an applied pressure on the green part until a target pressure in a sintering temperature range and keeping the applied pressure at the target pressure for a certain period of time such that the $\alpha$-$Si_3N_4$ particles are changed into rod-like $\beta$-$Si_3N_4$ nuclei and then flow in a one-dimensional or two-dimensional directions perpendicular to a direction of the applied pressure to align and anisotropically grow along the flow direction(s) under the applied pressure and thereby achieve textured $Si_3N_4$ ceramics with one-dimensional or two-dimensional texture.

2. The method of making textured ceramics according to claim 1, wherein the sintering aids are selected from the group consisting of alkali metal oxides and rare earth metal oxides.

3. The method of making textured ceramics according to claim 1, wherein a cold isostatic pressure used for the cold isostatic pressing is 50-300 MPa.

4. The method of making textured ceramics according to claim 1, wherein the texturing process is performed in the graphite die, and using flowing inert gas atmosphere for protection.

* * * * *